United States Patent [19]
Wang

[11] Patent Number: 5,478,018
[45] Date of Patent: Dec. 26, 1995

[54] FOOD PROCESSING DEVICE

[76] Inventor: Kuang-Pin Wang, 425, Dah Duen, Four Street, Taichung, Taiwan, 408

[21] Appl. No.: 310,199

[22] Filed: Sep. 21, 1994

[51] Int. Cl.[6] .................................................. B02C 19/20
[52] U.S. Cl. ...................... 241/100; 241/101.2; 241/169; 241/273.1; 241/285.2
[58] Field of Search ................................ 241/100, 101.1, 241/101.2, 169, 273.1, 285.2, 300.1; 83/666, 932, 720, 719

[56] References Cited

U.S. PATENT DOCUMENTS

| | | | |
|---|---|---|---|
| 86,527 | 2/1869 | Gilliland | 241/100 X |
| 2,851,074 | 9/1958 | Talge et al. | 83/719 X |
| 3,146,814 | 9/1964 | Anecki | 83/720 X |
| 4,212,431 | 7/1980 | Doyel | 241/100 |
| 4,247,054 | 1/1981 | Schulein et al. | 241/95 |
| 4,546,928 | 10/1985 | Suzuki | 241/95 |
| 4,928,893 | 5/1990 | Prindle | 241/95 |

*Primary Examiner*—John Husar
*Attorney, Agent, or Firm*—Pro-Techtor International

[57] ABSTRACT

A multifunctional food processing device is provided with a slicing member, a feeding member, a disk cutting tool, a slicing tool, a shredding tool, and a grinding tool for slicing, shredding and grinding fruit, vegetable and meat. A collecting tray is provided under the outlet for collecting the processed food. A chopping block is in turn provided respectively at the corners with a couple lugs can be rotatably with food processing device.

4 Claims, 7 Drawing Sheets

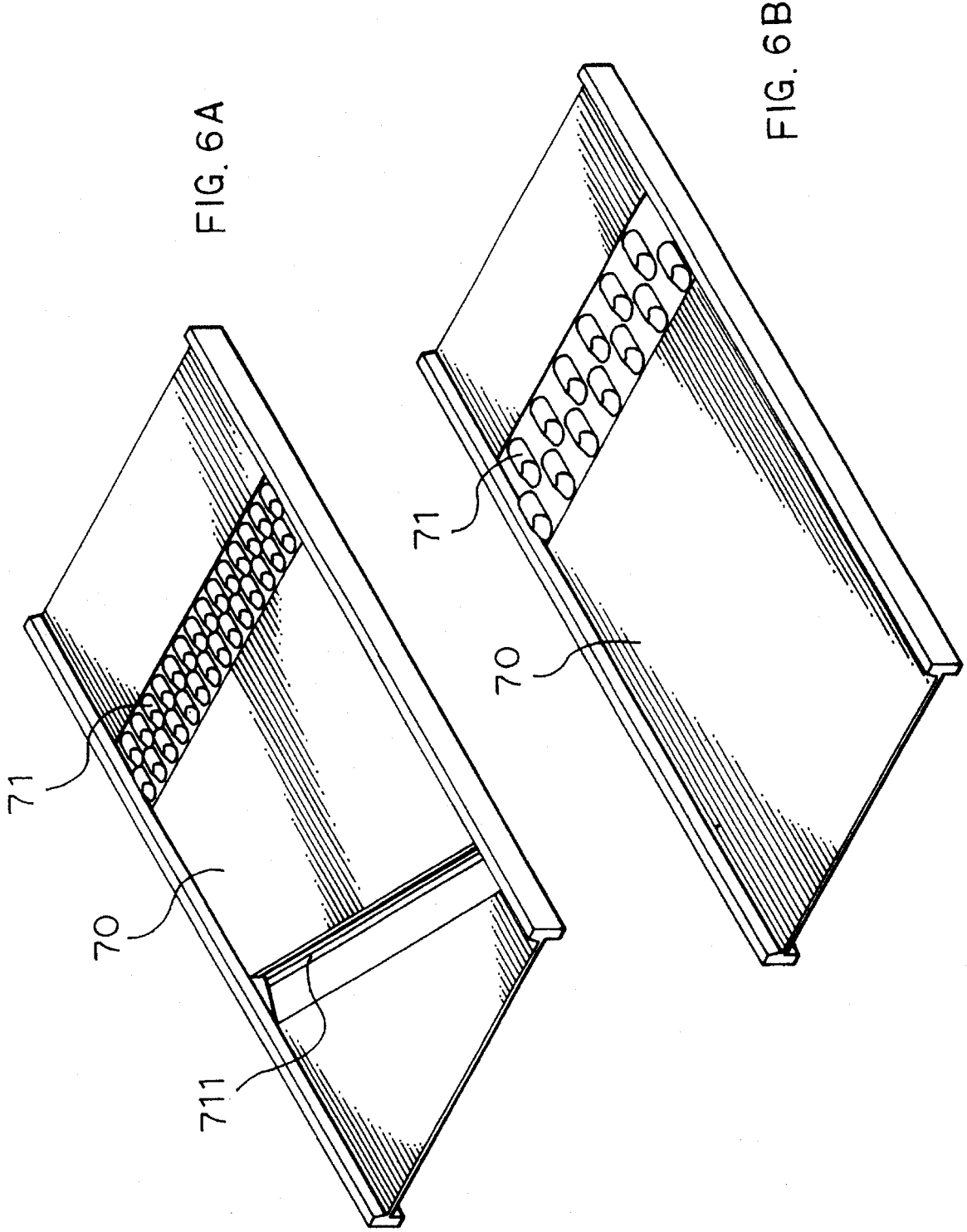

FOOD PROCESSING DEVICE

FIELD OF THE INVENTION

The present invention relates generally to a food processor, and more particularly to a food processing device capable of operating manually or by power to slice, shred and grind vegetable or meat into a paste for serving directly or for cooking.

BACKGROUND OF THE INVENTION

The conventional food processing devices, such as those disclosed in the U.S. Pat. Nos. 5,308,002 and 4,137,807, are generally limited in design in that they just only one funtion of slicing, or shredding, or dicing fruit, or vegetable, or meat. In other words, the consumers must purchase separate sets of food slicing device, food shredding device and food dicing device. The consumers are therefore forced to spend additional funds on various food processing devices. In addition, an extra set of food processing device can cause a storage space problem in a small private home in which the kichen is often provided with a limited space for keeping the kitchenware. Moreover, it is rather time-consuming and inconvenient to process fruit, vegetable and meat with such prior art food processing devices as described above, in view of the fact that these prior art food processing devices can not slice, shred and dice food interchangeably.

SUMMARY OF THE INVENTION

It is therefore the primary objective of the present invention to provide a food processing device capable of operating manually or by a power transmission to slice, shred fruit, vegetable or meat and to cut fruit, vegetable or meat into a paste. The device is provided with a slicing device, a feeding device, a slicing knife and a disk slicing knife. The device can be so adjusted as to cut food into narrow strips or to grind food into a paste. Located under the slicing knife is a collecting tray for gathering the food fragments produced during the cutting process.

It is another objective of the present invention to provide a food processor capable of processing economically fruit, vegetable and meat. The device is so compact that it can be kept in a small space.

It is still another objective of the present invention to provide a food processing device with thickness for adjusting means which permits an operation to slice food into pieces having a uniform thickness for improving the cooking effect and the cooking efficiency.

It is still another objective of the present invention to provide a food processing device with a plurality of slicing blades for shredding food into long narrow strips of various thicknesses.

It is still another objective of the present invention to provide a food processing device with a protective means shielding the disk slicing knife so as to safeguard the device operator from an injury inflicted on by the disk slicing knife.

It is still another objective of the present invention to provide a food processing device with a movable chopping block on which the food can be cut. When not in use, the movable chopping block can be disposed under the main body of the device.

It is still another objective of the present invention to provide a food processing device with a power driving means mounted on one end of the shaft of the disk slicing knife for operating the device electrically.

BRIEF DESCRIPTION OF THE DRAWINGS

FIG. 5-B shows another schematic view of the working of the rest plate and the adjustment button seat of the present invention.

FIG. 6A, B shows a schematic view of various cutting tools of the present invention.

DETAILED DESCRIPTION OF THE INVENTION

Figure 1:
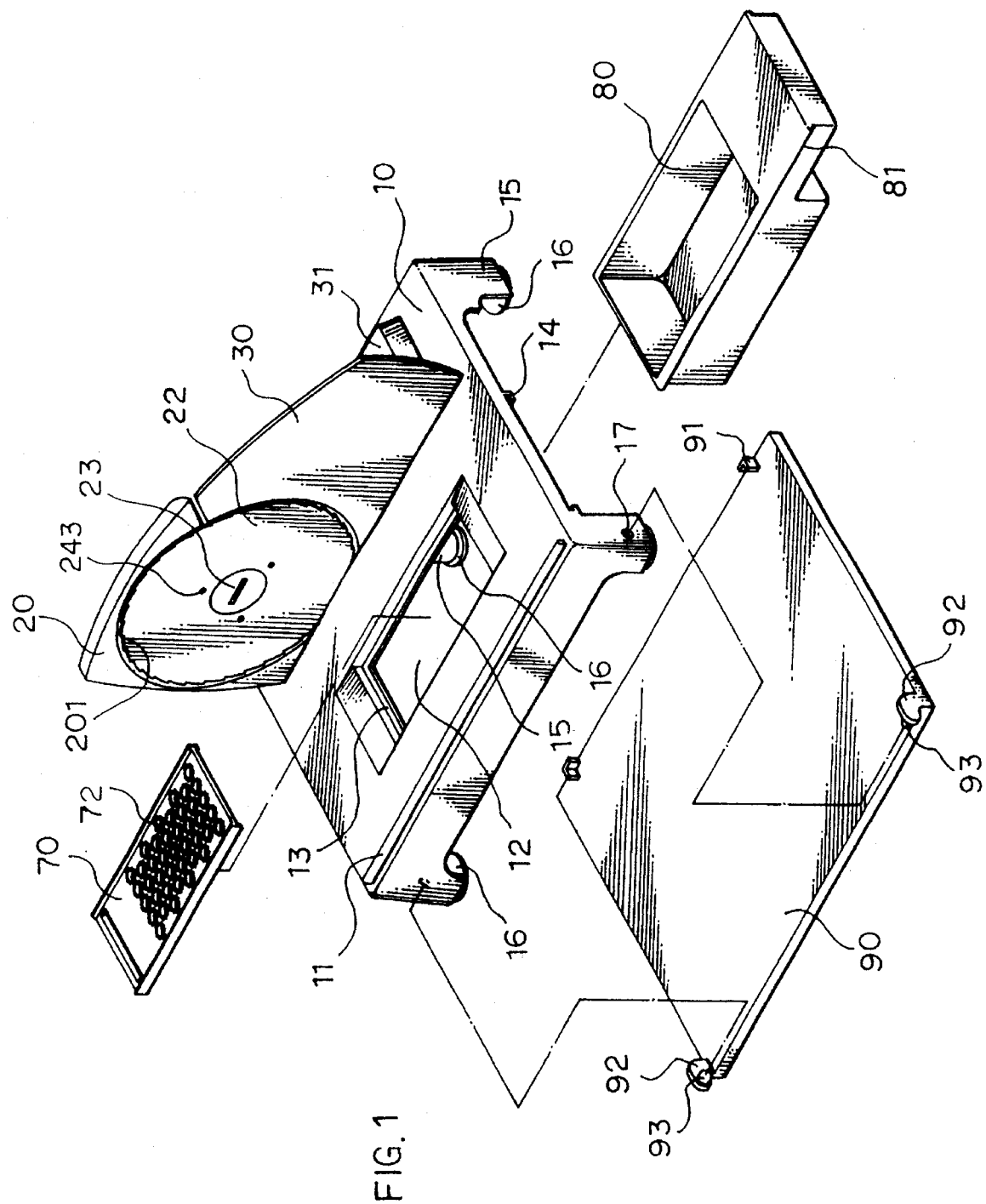
FIG. 1 shows an exploded view of the present invention.
Figure 2:
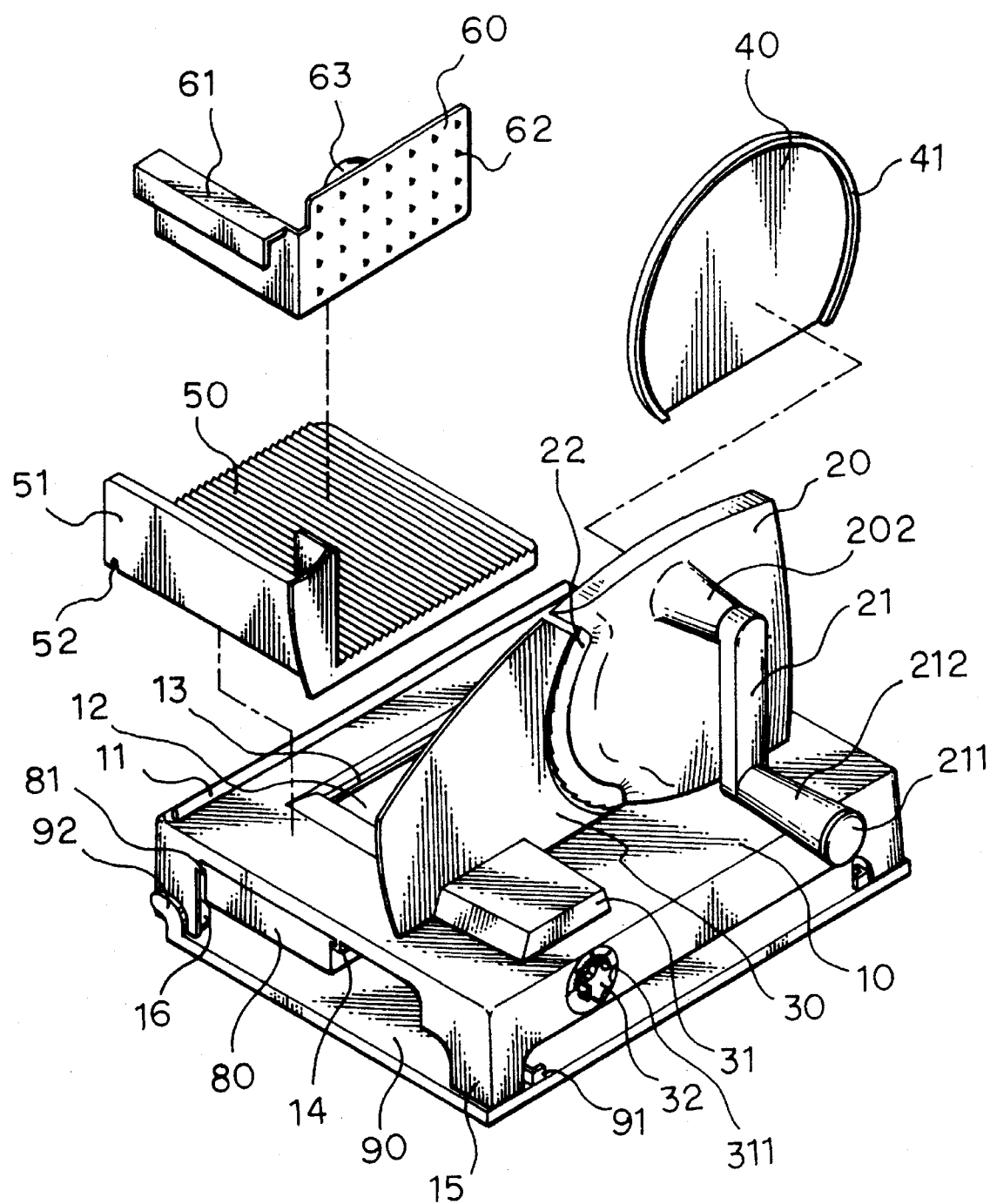
FIG. 2 shows another exploded view of the present invention.
Figure 3:
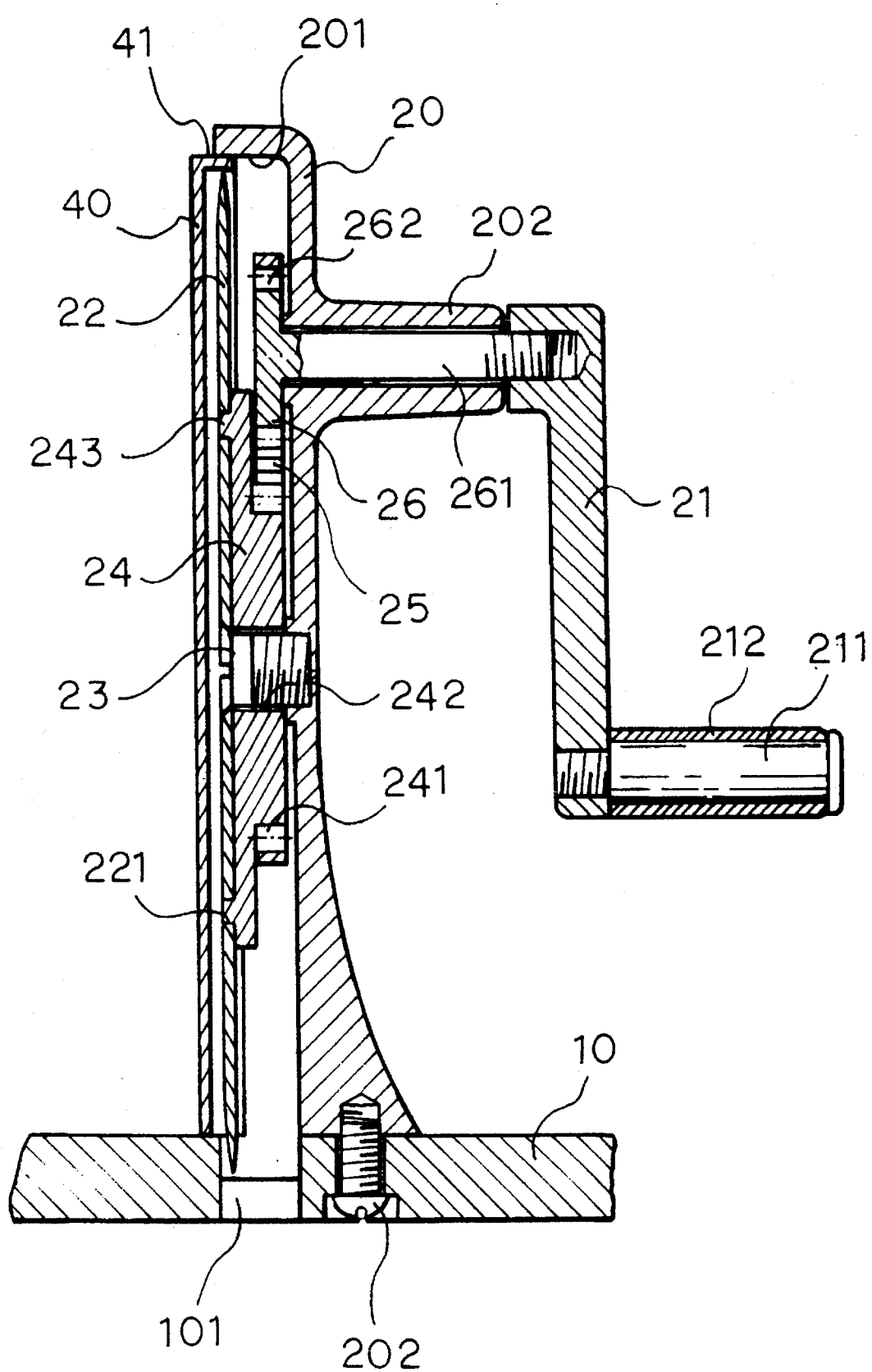
FIG. 3 shows a schematic view of a knife seat portion in combination according to the present invention.
Figure 4:
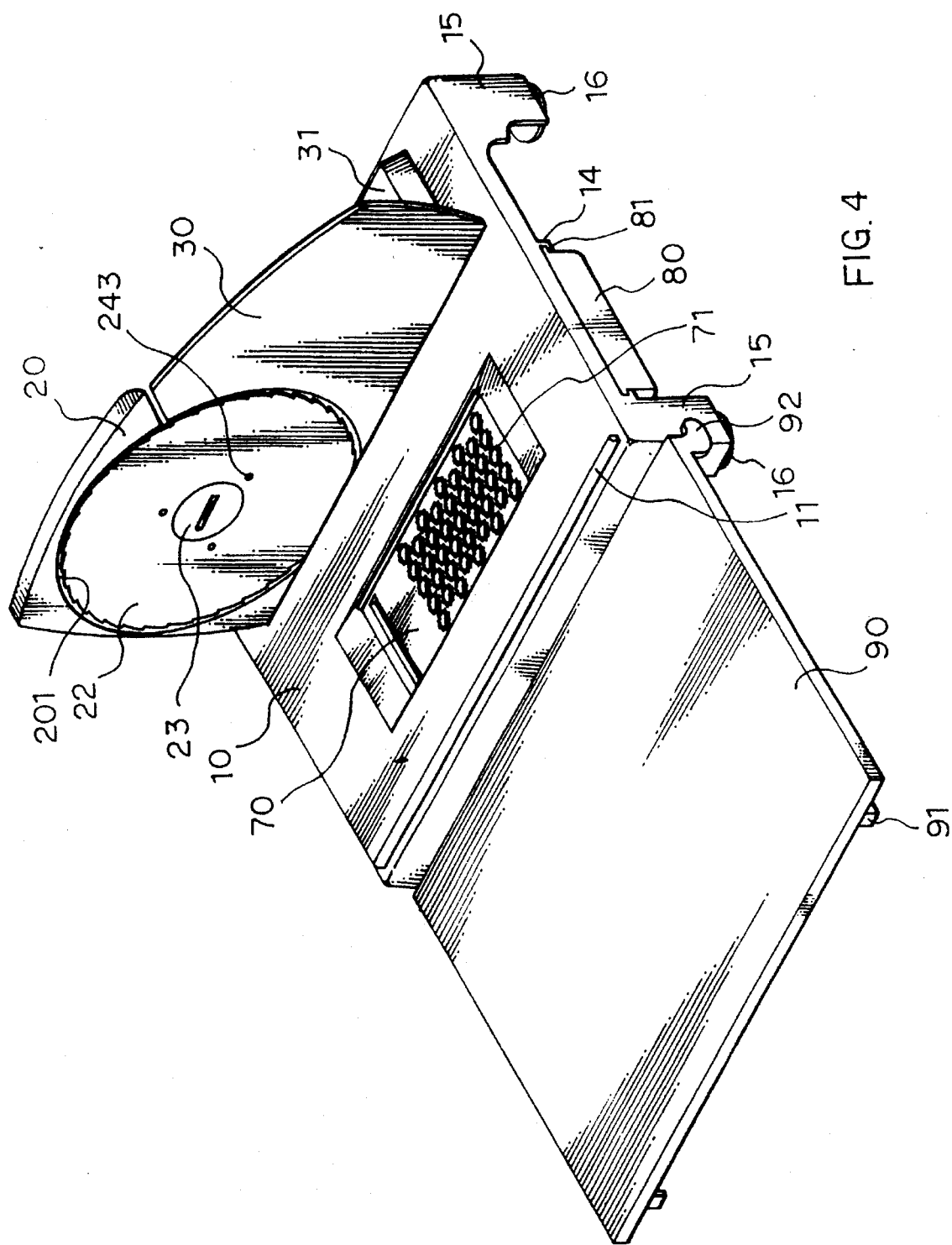
FIG. 4 shows another exploded view of the present invention.
Figure 5A:
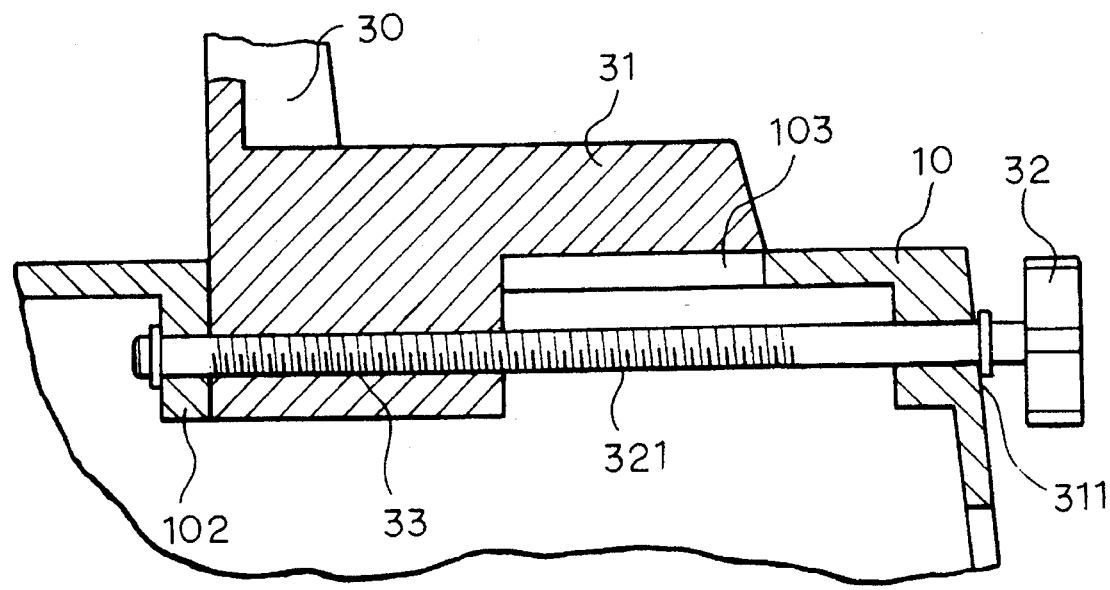
FIG. 5-A shows a schematic view of the working of a rest plate and adjustment button seat of the present invention.
Figure 5B:
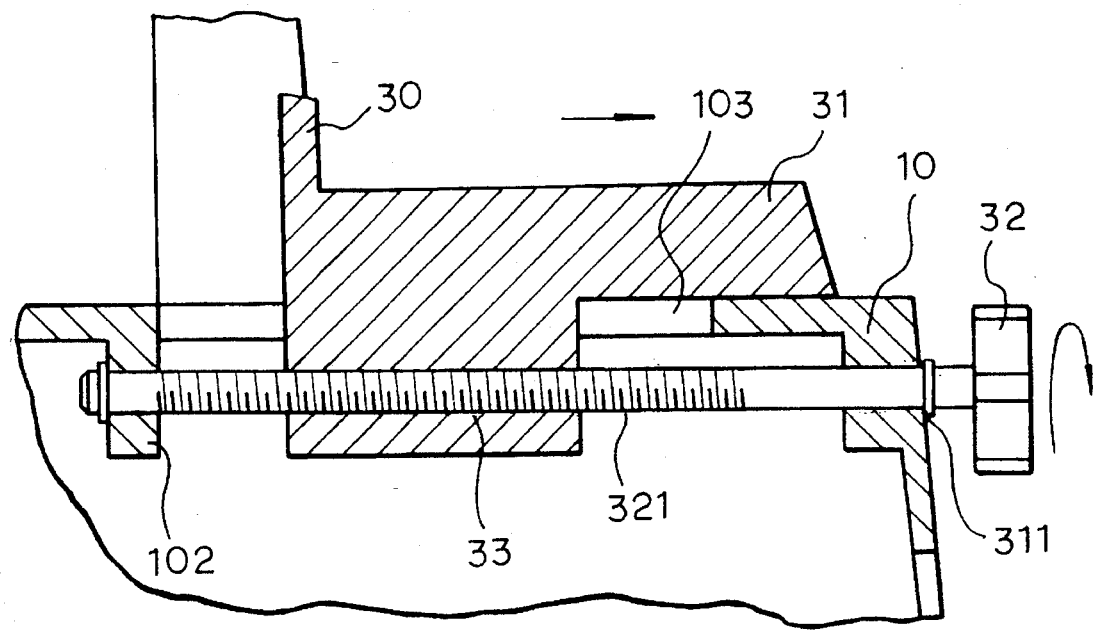

As shown in FIGS. 1 to 6, a food processor of a first preferred embodiment of the present invention comprises the component parts which are described explicitly hereinafter.

A main body 10 of a flat construction is provided respectively at the corners thereof and at the center thereof with a leg 15, which is provided at the bottom end thereof with an anti-skidding leg cushion 16. Two of the legs 15 are provided respectively with a through holes 17. The main body 10 is further provided in one side thereof with a longitudinal locating slot 11. Located at an appropriate distance from one side of the locating slot 11 are a knife seat 20 and a rest plate 30. The plan surface located between the locating slot 11 and the knife seat 20 is provided with an outlet 12 which is provided on the inner wall surface thereof with a frame edge 13. Located at the lower end of the outlet 12 are two guiding slot 14 opposite to each other.

The knife seat 20 is fastened to one side of the outlet 12 of the main body 10 by means of a bolt 203 located at the bottom of the knife seat 20. The knife seat 20 is composed of a disk cutting tool 22 and a fastening disk 24. The disk cutting tool 22 is provided centrally with a through hole 242. The disk cutting tool 22 is further provided with a plurality of through holes 221 which are angularly equidistant from the through hole 242. The fastening disk 24 is provided with a plurality of projections 243 which are corresponding in number and location to the through hole 242 of the disk cutting tool 22. The fastening disk 24 is fastened to one side of the knife seat 20 by means of fastening elements 23 engageable with the through hole 242. The fastening disk 24 is provided peripherally with a serrated portion 241.

A drive wheel 26 is mounted on a shaft having a threaded portion which is fitted into a sleeve 202 of the knife seat 20. The drive wheel 26 is provided peripherally with a toothed portion 262.

A transmission belt 25 is fastened to the serrated portion 241 of the fastening disk 24 and the toothed portion 262 of the drive wheel 26 for transferring the motion.

A hand drive handle 21 is coupled at one end thereof with one end of the shaft of the drive wheel 26. Another end of the hand drive handle 21 is provided with a rod portion 211 having thereon a handle jacket 212. The disk cutting tool 22 and the drive wheel 26 can be actuated by the hand drive handle 21.

The rest plate 30 is provided on one side thereof with a sliding portion 31 and is further provided at the bottom thereof with a threaded bole 33. The rest plate 30 is disposed such that the sliding portion 31 can be caused to move back and forth in a displacement hole 103 located by the knife seat 20. The sliding portion 31 and the knife seat 20 are located on the same side of the main body 10 such that the sliding portion 31 and the knife seat 20 are separated by an appropriate distance.

A thickness adjusting button 32 has a soomth rod which is provided at the midsegment thereof with a threaded portion 321, which is located between the two smooth portions of the smooth rod. The two smooth portions are received in the brackets 102 of the main body 10. The thickness adjusting button 32 is provided peripherally with a scale 311 and a pointer.

A protective plate 40 is similar in shape to the disk cutting tool 22 and is provided with a periphery 41 engageable with an inner peripheral surface 201.

A movable push plate 50 of a flat construction is provided with an upper rough surface and an insertion portion 52 which is located in the underside of the push plate 50 such that the insertion portion 52 is corresponding in location to the locating slot 11, of the main body 10. The movable push plate 50 can be slid freely over the outlet 12 of the main body 10. The insertion portion 52 is engageable with the locating slot 11 such that the insertion portion 52 can be moved back and forth in the locating slot 11.

A holding plate 60 of an L-shaped construction is provided on one end thereof with a sliding portion 61 capable of sliding back and forth on a support portion 51 of the movable push plate 50. The holding plate 60 has another end facing the knife seat 20 and is provided equidistantly with a plurality of hooked portions 62. The holding plate 60 is provided on the back thereof with a hand grip 63.

A plurality of slicing plates 70 are provided respectively with a shredding tool 71 which is capable of cutting food into a plurality of long narrow strips. The shredding tool 71 can be replaced with a grinding tool 72 which is capable of grinding food into a paste. The shredding tool 71 of various purposes are detachably and selectively mounted in the outlet 12 of the main body 10 such that the shredding tool 71 are retained and located by the frame edge 13 of the outlet 12.

A collecting tray 80 has an upper periphery 81 engageable with the guiding slot 14 located under the outlet 12 for collecting the food fragments. The collecting tray 80 is disposed movably such that it can be pulled out.

A choping block 90 is similar in shape and size to the main body 10 and is provided respectively at the corners thereof with a leg 91, which is in turn provided with a lug 92 having a protruded edge 93 dimensioned to fit rotatably into the through holes 17 of the legs 15 of the main body 10.

In operation, the chopping block 90 is first relocated to one side of the main body 10 by rotating the protruded edges 93 in the through holes 17. The protective plate 40 is then removed from the knife seat 20 before the push plate 50 is arranged on the outlet 12 of the main body 10. The food which is intened to be cut is placed on the movable push plate 50 such that the food is pushed by the hooked portion 62 of the holding plate 60 against the rest plate 30. In the meantime, the thickness adjusting button 32 is so rotated as to actuate the sliding portion 31 of the rest plate 30 to move outwards in the displacement hole 103 of the main body 10, thereby bringing about the adjustment of the dimension of a gap located between the rest plate 30 and the disk cutting tool 22. The dimension of the gap is corresponding to the desired thickness of the cut. The food intended to be cut is pushed by the push plate 50 toward the disk cutting tool 22, which can be driven to rotate by the hand drive handle 21 to cut the food into pieces having a desired thickness.

In case such food pieces as described above are to be shredded, the movable push plate 50 and the holding plate 60 must be first removed before the protective plate 40 is disposed in the inner circumferential edge of the knife seat 20 such that the disk cutting tool 22 is covered by the protective plate 40 for safeguarding the operator of the device. Thereafter, the slicing plate 70 is disposed in the outlet 12 such that the slicing plate 70 is located securely by the frame edge 13 of the outlet 12. The collecting tray 80 is then inserted into the guiding slot 14 located under the outlet 12. The food pieces intened to be shredded are held securely by the hooked portions 62 of the holding plate 60 and can be therefore moved back and forth on the slicing plate 70. The shredded food is collected in the collecting tray 80 via the outlet 12.

The vegetables, such as carrot, potato, onion, and others which are developed from the underground stems, can be ground into a paste by the food processing device of the present invention. In operation, the slicing plate 70 which is provided with a grinding tool 72 is disposed in the outlet 12 such that the slicing plate 70 is located securely by the frame edge 13 of the outlet 12. The food intended to be ground is held securely by the hooked portion 62 of the holding plate 60, thereby permitting the food to be moved back and forth on the slicing plate 70. The food paste so made is discharged into the collecting tray 80 via the outlet 12.

Figure 7:
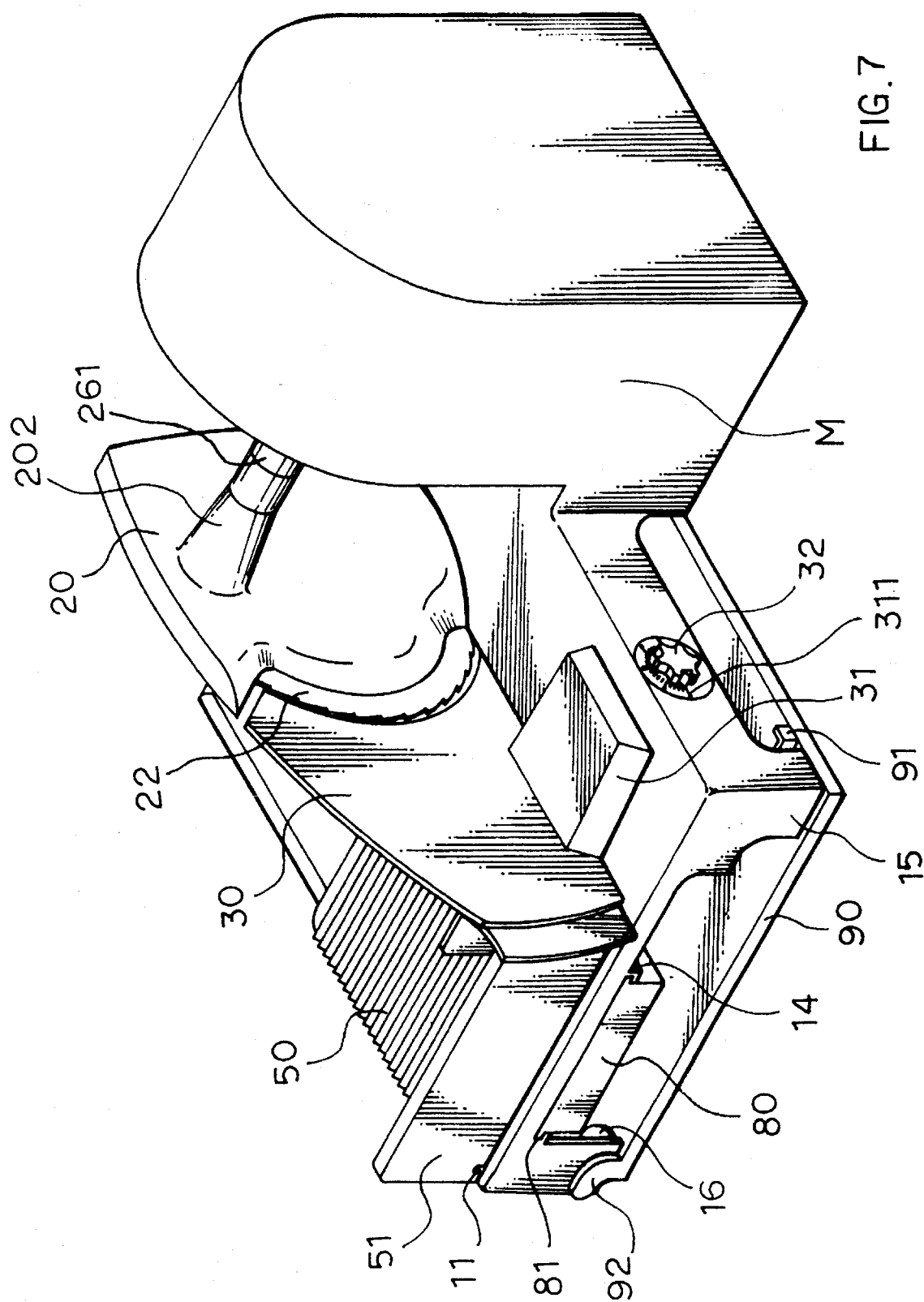
FIG. 7 shows a schematic view of another preferred embodiment in combination according to the present invention.

As shown in FIG. 7, the disk cutting tool 22 can be driven by a motor M via the drive wheel 26. The motor M is mounted on the threaded portion of the shaft of the drive wheel 26. The shaft is fitted into the sleeve 202 of the knife seat 20 such that the threaded portion of the shaft remains outside the sleeve 202.

The food processing device of the present invention has inherent advantages over the food processors of the prior art. Such inherent advantages are described hereinafter.

The food processing device of the present invention can be used to cut fruit, vegetable, and meat into pieces, which can be further sliced, shredded, diced, or ground. In other words, the food processing device of the present invention is multifunctional.

The food processing device of the present invention is economical in view of the fact that it is multifunctional.

The food processing device of the present invention is in fact a combination of several functions and therefore does not take up any additional kitchen space.

The food processing device of the present invention is compact and versatile. The entire construction of the device can be put together or changed freely by the consumer. The operation of the device is easy and time-saving.

What is claimed is:

1. A food processing device comprising:

A main body of a flat construction and provided at corners thereof and a center thereof with a plurality legs, each of which is provided a bottom end thereof with an anti-skidding leg cushion, two of said legs being provided respectively with a through hole, said main body further provided in one side thereof with a longitudinal locating slot, said main body further provided with a knife seat and a rest plate which are located an appropriate distance from one side of said locating slot, said main body further provided with an outlet located between said locating slot and said knife seat and provided in an inner periphery thereof with a frame edge, said outlet further provided thereunder with two guiding slot opposite in location to each other;

A knife seat having a bottom which is fastened to one side of said outlet of said main body, said knife seat comprising:

A disk cutting tool provided centrally with a central through hole having in a circumference thereof a plurality of equi-angularly spaced through holes;

A fastening disk provided with a plurality of projections corresponding in location and number to said through holes of said disk cutting tool, said fastening disk is fastened to one side of said knife seat by a fastening means engageable with said central through hole, said fastening disk further provided peripherally with a serrated portion;

A drive wheel provided with a rod portion having one end which is fitted into a sleeve of said knife seat and which is provided with a threaded portion extending beyond said sleeve, said drive wheel further provided peripherally with a toothed portion;

A transmission belt fastened respectively with said serrated portion of said fastening disk and said toothed portion of said drive wheel;

A hand drive handle fastened at one end thereof with a shaft of said drive wheel, said hand drive handle having another end fastened to a rod portion with a handle jacket for actuating said wheel drive and said disk cutting tool;

A rest plate provided with a sliding portion having a threaded hole, said rest plate disposed in said displacement hole of said knife seat such that said sliding portion is capable of moving back and forth in said displacement hole, and that said rest plate and said knife seat are located on the same side of said main body at an appropriate interval;

A thickness adjusting button having a rod-shaped end and a threaded portion located at the midsegment thereof, said threaded portion having two smooth ends portion received in said brackets of said main body, said thickness adjusting button provided peripherally with a scale and a pointer;

A protective plate similar in shape to said disk cutting tool and engageable with said knife seat;

A movable push plate having an upper rough surface and slidable over said outlet of said main body, said push plate further having an underside provided with an insertion portion corresponding in location to and engageable with said locating slot such that said push plate can be moved back and forth in the locating slot:

A holding plate of an L-shaped construction provided with a sliding portion movable on a support portion of said push plate, said holding plate further provided with a plurality of hooked portions;

A plurality of slicing plates which are provided respectively with a slicing tool, a shredding tool, a grinding tool and which are disposed respectively in said outlet such that said slicing plates are located by said frame edge of said outlet; and A collecting tray disposed movably under said outlet such that said collecting tray is held by said guiding slot located under said outlet.

2. The food processing device according to claim 1, wherein said disk cutting tool is mounted on said threaded portion of said rod portion of said drive wheel and is driven directly by a motor, 3. The food processing device according to claim 1, wherein said holding plate is provided on the back thereof with a hand grip.

4. The food processing device according to claim 1, wherein said main body is provided with a plurality of legs, two of said legs being located on the same side and provided respectively with a through hole; and wherein said main body is provided with a chopping block which is similar in shape and size to said main body and is provided with two legs, each of which is provided with a lugs having a protruded edge engageable with said through hole of each of said two legs of said main body.

* * * * *